United States Patent Office 3,562,361
Patented Feb. 9, 1971

3,562,361
O,O-DILOWER ALKENYL PHENOXYACETYL PHOSPHONATES
Dalta W. Gier, Laurinburg, N.C., assignor to Chemagro Corporation, New York, N.Y.
No Drawing. Continuation-in-part of application Ser. No. 449,640, Apr. 20, 1965, which is a continuation-in-part of application Ser. No. 412,263, Nov. 18, 1964. This application Oct. 17, 1967, Ser. No. 675,356
Int. Cl. A01n 9/36; C07f 9/40
U.S. Cl. 260—941    7 Claims

ABSTRACT OF THE DISCLOSURE

Compounds of the formula

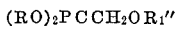

where $R_1$ is alkyl, phenyl, alkyl phenyl, chloroalkyl, cyanoalkyl, allyl, or methallyl and $R_2$ is mono, di or trihalophenyl, phenyl, alkyl phenyl, ring halo methyl phenyl, alkoxyphenyl are prepared by (1) reacting a compound having the formula $(R_1O)_3P$ with a compound having the formula

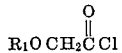

or (2) by reacting a compound having the formula

with a compound having the formula

The products are useful as desiccants and as herbicides. The allyl compounds are particularly effective as selective herbicides for broad leaf plants.

---

This application is a continuation-in-part of application Ser. No. 449,640, filed Apr. 20, 1965, now Patent 3,378,610 issued Apr. 16, 1968 and application Ser. No. 412,263, filed Nov. 18, 1964, now Patent 3,382,060 issued May 7, 1968.

This invention relates to novel phosphonates and their use as herbicides, defoliants and desiccants.

It is an object of the present invention to prepare new phosphonates.

Another object is to prepare improved compositions and processes for killing undesired plants.

An additional object is to prepare post-emergent herbicides.

A further object is to prepare pre-emergent herbicides.

Yet another object is to prepare formulations showing selective activity as pre-emergent and post-emergent herbicides.

A still further objective is to desiccate plants, particularly cotton.

Another object is to defoliate plants, particularly cotton.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing phosphonates of the formula

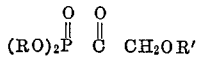

where R is alkyl, preferably lower alkyl, or phenyl or alkyl phenyl or lower alkenyl, preferably allyl or methallyl and R' is phenyl, lower alkyl phenyl, lower alkoxyphenyl mono, di or trihalophenyl or halo methyl phenyl. The preferred halogen is chlorine. Compounds having the above formula exhibit herbicidal properties. Examples of compounds within the present invention include:

O,O-dimethyl-4-chlorophenoxyacetyl phosphonate,
O,O-dimethyl-2-chlorophenoxyacetyl phosphonate,
O,O-dimethyl-2-methyl-4-chlorophenoxyacetyl phosphonate,
O,O-dimethyl-2,4-dichlorophenoxyacetyl phosphonate,
O,O-dimethyl-2,2,4,5-tribromophenoxyacetyl phosphonate,
O,O-dimethyl-2,4-dichloro-5-bromophenoxyacetyl phosphonate,
O,O-dimethyl-2,4,5-trifluorophenoxyacetyl phosphonate,
O,O-diethyl-2-chlorophenoxyacetyl phosphonate,
O,O-diethyl-4-chlorophenoxyacetyl phosphonate,
O,O-diethyl-3-chlorophenoxy acetyl phosphonate,
O,O-diethyl-2,4-dichlorophenoxyacetyl phosphonate,
O,O-diethyl-2,6-dichlorophenoxyacetyl phosphonate,
O,O-diethyl-3,4-dichlorophenoxyacetyl phosphonate,
O,O-diethyl-2,4,5-trichlorophenoxyacetyl phosphonate,
O,O-diethyl-2,4,5-triiodophenoxyacetyl phosphonate,
O,O-diethyl-2-methyl-4-bromophenoxyacetyl phosphonate,
O,O-diethyl-2-methyl-4-chlorophenoxyacetyl phosphonate,
O,O-diethyl-2,3,4-trichlorophenoxyacetyl phosphonate,
O,O-diethyl-2,4,6-trichlorophenoxyacetyl phosphonate,
O,O-di-3'-chloropropyl-4-chlorophenoxyacetyl phosphonate,
O,O-di-5'-chloroamyl-4-chlorophenoxyacetyl phosphonate,
O,O-diisopropyl-4-chlorophenoxyacetyl phosphonate,
O,O-di-2'-chloroethyl-2-chlorophenoxyacetyl phosphonate,
O,O-di-2'-cyanoisopropyl-4-chlorophenoxyacetyl phosphonate,
O,O-di-3'-cyanopropyl-4-chlorophenoxyacetyl phosphonate,
O,O-di-6'-cyanohexyl-4-chlorophenoxyacetyl phosphonate,
O,O-di-octadecyl-4-chlorophenoxyacetyl phosphonate,
O,O-p-octylphenyl-4-chlorophenoxyacetyl phosphonate,
O,O-di-2'-chloroethyl-2-methyl-4-chlorophenoxyacetyl phosphonate,
O,O-diisopropyl-2-methyl-4-chlorophenoxyacetyl phosphonate,
O,O-2'cyanisopropyl-2-methyl-4-chloro-phenoxyacetyl phosphonate,
O,O-dihexyl-2-methyl-4-chlorophenoxyacetyl phosphonate,
O,O-diisooctyl-2-methyl-4-chlorophenoxyacetyl phosphonate,
O,O-dioctadecyl-2-methyl-4-chlorophenoxyacetyl phosphonate,
O,O-di-p-octylphenyl-2-methyl-4-chlorophenoxyacetyl phosphonate,
O,O-dimethyl-2,4-dichlorophenoxyacetyl phosphonate,
O,O-di-2'-chloroethyl-2,4-dichlorophenoxyacetyl phosphonate,
O,O-diisopropyl-2,4-dichlorophenoxyacetyl phosphonate,
O,O-di-2'-cyanoisopropyl-2,4-dichlorophenoxyacetyl phosphonate,
O,O-di-n-butyl-2,4-dichlorophenoxyacetyl phosphonate,
O,O-dihexyl-2,4-dichlorophenoxyacetyl phosphonate,
O,O-diisooctyl-2,4-dichlorophenoxyacetyl phosphonate,
O,O-diisooctyl-2,4-dichlorophenoxyacetyl phosphonate, O,O-di-2'-ethylhexyl-2,4-dichlorophenoxyacetyl phosphonate,
O,O-dioctadecyl-2,4-dichlorophenoxyacetyl phosphonate,
O,O-diphenyl-2,4-dichlorophenoxyacetyl phosphonate,
O,O-di-2'-chloroethyl-2,4,5-trichlorophenoxyacetyl phosphonate,
O,O-diisopropyl-2,4,5-trichlorophenoxyacetyl phosphonate,
O,O-di-2'-cyanoisopropyl-2,4,5-trichlorophenoxyacetyl phosphonate,
O,O-dihexyl-2,4,5-trichlorophenoxyacetyl phosphonate,
O,O-dioctadecyl-2,4,5-trichlorophenoxyacetyl phosphonate,
O,O-di-p-octylphenyl-2,4,5-trichlorophenoxyacetyl phosphonate,
O,O-diallylphenoxyacetyl phosphonate,
O,O-dimethallylphenoxyacetyl phosphonate,
O,O-diallyl-4-methylphenoxyacetyl phosphonate,
O,O-dimethyallyl-4-methylphenoxyacetyl phosphonate,
O,O-diallyl-2-methylphenoxyacetyl phosphonate,
O,O-diallyl-2-methyl-4-chlorophenoxyacetyl phosphonate,
O,O-dimethylallyl-2-methyl-4-chlorophenoxyacetyl phosphonate,
O,O-diallyl-4-chlorophenoxyacetyl phosphonate,
O,O-dimethyallyl-4-chlorophenoxyacetyl phosphonate,
O,O-diallyl-2,4-dichlorophenoxyacetyl phosphonate,
O,O-dimethyallyl-2,4-dichlorophenoxyacetyl phosphonate,
O,O-diallyl-2,4,5-trichlorophenoxyacetyl phosphonate,
O,O-dimethyallyl-2,4,5-trichlorophenoxyacetyl phosphonate,
O,O-diallyl-2,4,5-trichlorophenoxyacetyl phosphonate,
O,O-diallyl-2,4,5-trichlorophenoxyacetyl phosphonate, nate,
O,O-diallyl-4-ethylphenoxyacetyl phosphonate,
O,O-diallyl-4-t-butylphenoxyacetyl phosphonate,
O,O-diallyl-4-methoxyphenoxyacetyl phosphonate,
O,O-diallyl-4-ethoxyphenoxyacetyl phosphonate,
O,O-dimethyallyl-4-ethoxyphenoxyacetyl phosphonate.

The allyl and methallyl compounds where R' is lower alkylphenyl are particularly effective as selective preemergent herbicides for killing broad leaf plants.

The new compounds of the present invention are prepared by the following procedures.

PROCEDURE A

A known quantity of phenoxyacetyl chloride is placed in a reaction flask equipped with a mechanical stirrer, condenser and dropping funnel. (Solid acid chlorides were dissolved in a minimum of dry benzene while liquid acid chlorides were reacted without solvent.) Slightly more than an equimolar quantity of the desired trialkyl phosphite was added dropwise to the phenoxy acetyl chloride with vigorous stirring. For 0.1 molar quantities, 20 to 30 minute periods were necessary for addition of the phosphite. In all cases, the reaction rates were relatively high and easily observable by liberation of heat. Following the addition of the phosphite, the reaction mixture was heated to 80–100° C. for 2–3 hours.

A vacuum was then applied to the reaction flask (0.5–1.0 mm. pressure) and the product was stripped at a pot temperature of 110–150° C. All of the products obtained were clear to pale red oils, or semi-solids of high solubility in most organic solvents.

The essence of the above procedure is reacting the phenoxyacetyl chloride with a trialkyl phosphate and removing the organic chloride formed, preferably under reduced pressure.

PROCEDURE B

A known quantity of the phenoxyacetyl chloride was placed in the reaction flask. (Solid acid chlorides were dissolved in a minimum of dry benzene while no solvent was used with liquid acid chlorides.) Slightly more than an equimolar quantity of the desired dialkyl hydrogen phosphite or diaryl hydrogen phosphite was added dropwise to the phenoxy acetyl chloride with vigorous stirring. For 0.1 molar quantities, 20 to 30 minute periods were necessary for addition of the phosphite. In all cases, the reaction rates were relatively high and easily observable by liberation of heat. Following addition of the phosphite, aspirator vacuum (50–75 mm. pressure) was applied to the reaction flask through the condenser and the reaction mixture was heated to 80–110° C. for 2–3 hours.

A vacuum (0.5–1 mm. pressure) was then applied to the reaction flask and the product was stripped at a pot temperature of 110–150° C. All of the products obtained were clear to pale red oils, or semi-solids having a high solubility in most organic solvents.

The essence of Procedure B is reacting the phenoxyacetyl chloride with a dialkyl or diaryl hydrogen phosphite and removing the hydrogen chloride formed, preferably under reduced pressure.

PROCEDURE C 0.1 mole of the phenoxyacetyl chloride was placed in a reaction flask equipped with stirrer, thermometer, dropping funnel and side-arm leading to a collection flask in a Dry Ice-acetone bath and attached to variable vacuum. This was heated to 145° C., and a vacuum of about 40 mm. was applied and 0.1 mole of triallyl or trimethallyl phosphite was added dropwise. The temperature was maintained between 140° C. and 155° C. by increase or decrease in vacuum. The allyl chloride or methallyl chloride formed was distilled and the desired phosphonate product remained in the flask. After all the phosphite was added the temperature was kept at 140–150° C., e.g. 145° C. for 10 minutes under about 2 mm. vacuum.

The O,O-dialkyl phosphonates can be prepared by either Procedure A or Procedure B. The O,O-diaryl phosphonates can be prepared only by Procedure B.

Illustrative of starting phenoxy acetyl chlorides are 2-chlorophenoxy acetyl chloride, 4-chlorophenoxy acetyl chloride, 2,4-dichlorophenoxy acetyl chloride, 2,4,5-trichlorophenoxy acetyl chloride, 2,4,5-tribromophenoxy acetyl chloride, 2,4,5-tribromophenoxy acetyl bromide, 2-methyl-4-chlorophenoxy acetyl chloride, phenoxyacetyl chloride, 4-methylphenoxy acetyl chloride, 4-methoxyphenoxyacetyl chloride.

Illustrative of starting phosphites for Procedure A are trimethyl phosphite, triethyl phosphite, dimethyl ethyl phosphite, tripropyl phosphite, triisopropyl phosphite, tri-n-butyl phosphite, trihexyl phosphite, tri-n-octyl phosphite, triisooctyl phosphite, tri (2-ethyl hexyl) phosphite, and trilauryl phosphite.

Illustrative starting phosphites for Procedure B are dimethyl hydrogen phosphite, diethyl hydrogen phosphite, dipropyl hydrogen phosphite, diisopropyl hydrogen phosphite, di-n-butyl hydrogen phosphite, di-2-ethyl hexyl hydrogen phosphite, diphenyl hydrogen phosphite, di-p-tolyl hydrogen phosphite.

Unless otherwise indicated all parts and percentages are by weight.

Example 1

10.25 grams (0.05 mole) of p-chlorophenoxy acetyl chloride was treated according to Procedure A with 6.2 grams (0.05 mole) of trimethyl phosphite to give 6.7 grams (48% yield) of O,O - dimethyl - 4 - chlorophenoxy acetyl phosphonate as a clear oil; $n_D^{25}$ 1.4965; percent Cl 11.3 (12.7 theory); percent P 11.8 (11.1 theory).

Example 2

10.25 grams (0.05 mole) of p-chlorophenoxy acetyl chloride was treated according to Procedure A with 8.3 grams (0.05 mole) of triethyl phosphite to give 11.0 grams (72% yield) of O,O-diethyl-4-chlorophenoxy acetyl phosphonate as a clear oil; $n_D^{25}$ 1.4955; percent Cl 10.6 (theory 11.2); percent P 10.4 (theory 10.0).

Example 3

10.25 grams (0.05 mole) of p-chlorophenoxy acetyl chloride was treated according to Procedure A with 12.5 grams (0.05 mole) of tri-n-butylphosphite to give 14.3 grams (78% yield) of O,O - di - n - butyl-4-chlorophenoxy acetyl phosphonate as a clear oil; $n_D^{25}$ 1.4904; percent Cl 9.4 (theory 9.7); percent P 8.4 (theory 8.5).

Example 4

10.25 grams (0.05 mole) of p-chlorophenoxy acetyl chloroide was treated according to Procedure B with 11.7 grams (0.05 mole) of diphenyl hydrogen phosphite to give 15.3 grams (75% yield) of O,O-diphenyl-4-chlorophenoxy acetyl phosphonate as a clear oil; $n_D^{25}$ 1.5740; percent Cl 9.1 (theory 8.8); percent P 8.1 (theory 7.7).

Example 5

10.25 grams (0.05 mole) of O-chlorophenoxy acetyl chloride was treated according to Procedure A with 6.2 grams (0.05 mole) of trimethyl phosphite to give 11.0 grams (78.6% yield) of O,O-dimethyl-2-chlorophenoxy acetyl phosphonate as a clear oil; $n_D^{25}$ 1.5185; percent Cl 13.6 (theory 12.7); percent P 10.4 (theory 11.1).

Example 6

20.5 grams (0.1 mole) of O-chlorophenoxy acetyl chloride was treated according to Procedure A with 20 grams (0.12 mole) of triethyl phosphite to give 28.3 grams (97.6% yield) of O,O-diethyl-2-chlorophenoxy acetyl phosphonate as a light rose-colored oil; $n_D^{25}$ 1.5040; percent Cl 10.0 (theory 9.7); percent P 10.4 (theory 11.1).

Example 7

10.25 grams (0.05 mole) of O-chlorophenoxy acetyl chloride was treated according to Procedure A with 12.5 grams (0.05 mole) of tri-n-butyl phosphite to give 15.9 grams (78.3% yield) of O,O-di-n-butyl-2-chlorophenoxy acetyl phosphonate as a clear oil; $n_D^{25}$ 1.4895; percent Cl 9.2 (theory 9.7); percent P 8.8 (theory 8.5).

Example 8

10.25 grams (0.05 mole) of O-chlorophenoxy acetyl chloride was treated according to Procedure B with 11.7 grams (0.05 mole) of diphenyl hydrogen phosphite to give 15 grams (74% yield) of O,O-diphenyl-2-chlorophenoxy acetyl phosphonate as a light yellow oil; $n_D^{25}$ 1.5703; percent Cl 8.4 (theory 8.8); percent P 7.5 (theory 7.6).

Example 9

13.8 grams (0.05 mole) of 2,4,5-trichlorophenoxy acetyl chloride was treated according to Procedure A with 6.2 grams (0.05 mole) of trimethyl phosphite to give 13.0 grams (74.9% yield) of O,O-dimethyl-2,4,5-trichlorophenoxy acetyl phosphonate as a white semi-solid; $n_D^{25}$ 1.5012; percent Cl 33 (theory 31); percent P 8.3 (theory 8.8).

Example 10

53.6 grams (0.2 mole) of 2,4,5-trichlorophenoxy acetyl chloride was treated according to Procedure A with 33.2 grams (0.2 mole) of triethyl phosphite to give 65 grams (95.6% yield) of O,O - diethyl - 2,4,5 - trichlorophenoxy acetyl phosphonate as a pale yellow semi-solid; $n_D^{25}$ 1.5015; percent Cl 28.5 (theory 28.2); percent P 8.2 (theory 8.3).

Example 11

13.8 grams (0.05 mole) of 2,4,5-trichlorophenoxy acetyl chloride was treated according to Procedure A with 15.0 grams (0.06 mole) of tri-n-butylphosphite to give 20.6 grams (80% yield) of O,O - di - n - butyl - 2,4,5 - trichlorophenoxy acetyl phosphonate as a clear oil; $n_D^{25}$ 1.4950; percent Cl 23.8 (theory 24.5); percent P 7.8 (theory 7.2).

Example 12

13.8 grams (0.05 mole) of 2,4,5-trichlorophenoxy acetyl chloride was treated according to Procedure B with 11.7 grams (0.05 mole) of diphenyl hydrogen phosphite to give 16.6 grams (70% yield) of O,O-diphenyl-2,4,5-trichlorophenoxy acetyl phosphonate as a pale yellow semi-solid; $n_D^{25}$ 1.5715; percent Cl 19.5 (theory 22.5); percent P 7.2 (theory 6.6).

Example 13

11.55 grams (0.05 mole) of 2-methyl-4-chlorophenoxy acetyl chloride was treated according to Procedure A with 6.2 grams (0.05 mole) of trimethyl phosphite to give 14.3 grams (98.%  yield) of O,O-dimethyl-2-methyl-4-chlorophenoxy acetyl phosphonate as a pale yellow oil, $n_D^{25}$ 1.5106; percent Cl 12.8 (theory 12.1); percent P 10.3 (theory 10.6).

Example 14

20.1 grams (0.1 mole) of 2-methyl-4-chlorophenoxy acetyl chloride was treated according to Procedure A with 20 grams (0.12 mole) of triethyl phosphite to give 29.4 grams (99% yield) of O,O-diethyl - 2 - methyl-4-chlorophenoxy acetyl phosphonate as a pale pink oil; $n_D^{25}$ 1.5015; percent Cl 10.6 (theory 11.6); percent P 10.0 (theory 10.1).

Example 15

11.55 grams (0.05 mole) of 2-methyl-4-chlorophenoxy acetyl chloride was treated according to Procedure A with 12.5 grams (0.05 mole) of tri-n-butyl phosphite to give 18.6 grams (99% yield) of O,O-di-n-butyl - 2-methyl-4-chlorophenoxy acetyl phosphonate as a clear oil; $n_D^{25}$ 1.4974; percent Cl 9.7 (theory 9.4); percent P 7.9 (theory 8.3).

Example 16

11.55 grams (0.05 mole) of 2-methyl-4-chlorophenoxy acetyl chloride was treated according to Procedure B with 11.7 grams (0.05 mole) of diphenyl hydrogen phosphite to give 19.3 grams (93% yield) of O,O-diphenyl - 2-methyl-4-chlorophenoxy acetyl phosphonate as a clear oil; $n_D^{25}$ 1.5680; percent Cl 8.5 (theory 8.5); percent P 8.2 (theory 7.4).

Example 17

10.25 grams (0.05 mole) of o-chlorophenoxy acetyl chloride was treated according to Procedure B with 15.3 grams (0.05 mole) of di-2-ethyl hexyl hydrogen phosphite to give 17.8 grams (75% yield) of O,O-di-2-ethyl hexyl-2-chlorophenoxy acetyl phosphonate as a clear oil; $n_D^{25}$ 1.4860; percent Cl 7.2 (theory 7.5); percent P 6.2 (theory 6.5).

Example 18

10.25 grams (0.05 mole) of p-chlorophenoxy acetyl chloride was treated according to Procedure B with 15.3 grams (0.05 mole) of di-2-ethyl hexyl hydrogen phosphite to give 17.8 grams (75% yield) of O,O-di-2-ethyl hexyl-4-chlorophenoxy acetyl phosphonate as a clear oil; $n_D^{25}$ 1.4839; percent Cl 6.7 (theory 7.5); percent P 6.6 (theory 6.5).

Example 19

11.55 grams (0.05 mole) of 2-methyl-4-chlorophenoxy acetyl chloride was treated according to Procedure B with 15.3 grams (0.05 mole) of di-2-ethyl hexyl hydrogen phosphite to give 21 grams (85% yield) of O,O-di-(2 - ethyl hexyl) - (2 - methyl-4-chlorophenoxy acetyl) phosphonate as a clear oil; $n_D^{25}$ 1.4858; percent Cl 7.0 (theory 7.2); percent P 5.5 (theory 6.3).

Example 20

13.8 grams (0.05 mole) of 2,4,5-trichlorophenoxy acetyl chloride was treated according to Procedure B with 15.3 grams (0.05 mole) of di-2-ethyl hexyl hydrogen phosphite to give 15.8 grams (58% yield) of O,O-di-(2-ethyl hexyl) - (2,4,5-trichlorophenoxy acetyl) phosphonate as a clear oil; $n_D^{25}$ 1.4875; percent Cl 18.8 (theory 19.6); percent P 6.7 (theory 5.7).

Using Procedure A with the appropriate substituted phenoxyacetyl phosphite and the appropriate trialkyl or tri substituted alkyl phosphite, e.g. tri (2-chloroethyl) phosphite, tris(2-cyanoisopropyl) phosphite, tris octadecyl phosphite there were obtained as shown in Table A the indicated chlorophenoxy acetyl phosphonates where X and Y indicated the substituents on the phenoxy group and R and R' indicate the groups attached to the two available oxygens of the phosphonate. As indicated in the table, R and R' were the same.

Using Procedure B in similar fashion there were obtained the indicated phosphonates wherein R and R' were aryl.

chlorophenoxyacetyl phosphonate as a pale red oil (Yield 54.5%).

Example 25

21.9 grams (0.1 mole) of 2-methyl-4-chlorophenoxyacetyl chloride was heated to 140° C., a vacuum of 40 mm. applied and 20.2 grams (0.1 mole) of triallyl phosphite was added dropwise. The temperature was increased to 155° C. and the vacuum increased to 5 mm. for 30 minutes. The product was then stripped at 140° C. and 2 mm. to give O,O-diallyl-2-methyl-4-chlorophenoxyacetyl phosphonate as a pale yellow oil (Yield 93%).

TABLE A

| X | Y | R and R' | Percent yield | Percent Cl Found | Percent Cl Theory | Percent P Found | Percent P Theory |
|---|---|---|---|---|---|---|---|
| 4-chloro | | 2'-chloroethyl | 98 | 27.9 | 28.3 | 7.9 | 8.2 |
| Do | | Isopropyl | 92 | 10.6 | 10.6 | 9.3 | 9.3 |
| Do | | 2'-cyanoisopropyl | 91 | 9.9 | 9.5 | 7.1 | 8.3 |
| Do | | Hexyl | 93 | 8.6 | 8.5 | 7.1 | 7.4 |
| Do | | Isooctyl | 92 | 7.8 | 7.5 | 6.0 | 6.5 |
| Do | | Octadecyl | 99 | 7.5 | 7.5 | 6.6 | 6.5 |
| Do | | p-Octylphenyl | 99 | 9.5 | 8.7 | 6.7 | 7.6 |
| Do | 2-methyl | 2'-chloroethyl | 99 | 28.6 | 27.4 | 7.5 | 7.9 |
| Do | do | Isopropyl | 88 | 11.0 | 10.2 | 8.7 | 8.9 |
| Do | do | 2'-cyanoisopropyl | 67 | 11.4 | 9.1 | 7.0 | 7.9 |
| Do | do | Hexyl | 99 | 9.0 | 8.2 | 6.5 | 7.1 |
| Do | do | Isooctyl | 72 | 8.0 | 7.3 | 7.3 | 6.3 |
| Do | do | Octadecyl | 99 | 4.1 | 4.6 | 3.7 | 4.9 |
| Do | do | p-Octylphenyl | 99 | 10 | 7.9 | 6.3 | 6.9 |
| 2,4-dichloro | | Methyl | 89 | 22.3 | 22.7 | 9.7 | 9.9 |
| Do | | Ethyl | 93 | 19.8 | 21.0 | 9.2 | 9.2 |
| Do | | 2'-chloroethyl | 98 | 34.6 | 34.8 | 9.4 | 7.6 |
| Do | | Isopropyl | 84 | 18.4 | 19.2 | 9.0 | 8.4 |
| Do | | 2'-cyanoisopropyl | 94 | 16.6 | 17.4 | 7.3 | 7.6 |
| Do | | n-Butyl | 98 | 18.1 | 17.9 | 7.8 | 7.8 |
| Do | | Hexyl | 97 | 16.8 | 15.7 | 6.6 | 6.8 |
| Do | | Isooctyl | 97 | 14.6 | 14.0 | 5.6 | 6.1 |
| Do | | 2'-ethylhexyl | 78 | 13.0 | 14.0 | 6.8 | 6.1 |
| Do | | Octadecyl | 99 | 8.3 | 9.0 | 3.7 | 3.9 |
| Do | | p-Octylphenyl | 92 | 12.4 | 14.9 | 6.6 | 6.5 |
| Do | | Phenyl | 84 | 17.0 | 16.2 | 7.8 | 7.1 |
| 2,4,5-trichloro | | 2'-chloroethyl | 85.3 | 38.6 | 39.9 | 7.0 | 7.0 |
| Do | | Isopropyl | 69 | 29.7 | 26.5 | 6.7 | 7.7 |
| Do | | 2-cyanoisopropyl | 52 | 21.0 | 25.1 | 5.1 | 7.3 |
| Do | | Hexyl | 69 | 19.6 | 21.8 | 6.5 | 6.4 |
| Do | | Isooctyl | 81 | 17.5 | 19.6 | 6.0 | 5.7 |
| Do | | Octadecyl | 99 | 14.2 | 13.0 | 3.7 | 3.8 |
| Do | | P-octylphenyl | 73 | 21.1 | 20.9 | 6.3 | 6.1 |

Example 21

To 17.05 grams (0.1 mole) of phenoxyacetyl chloride there was added dropwise 20.2 grams (0.1 mole) of tris allyl phosphite. No heat was liberated. Vacuum was applied (80 mm.) and the mixture was heated slowly up to 150° C. while removing allyl chloride. There was obtained as the product O,O-diallyl phenoxyacetyl phosphonate as a pale yellow oil (yield about 100%). It was restripped at 140° C. at 2 mm. to give the purified product as a pale red oil in an amount of 44%.

Example 22

The procedure of Example 21 was repeated, replacing the phenoxyacetyl chloride by 0.1 mole of p-toloxyacetyl chloride (4-methylphenoxyacetyl chloride) to obtain O,O-diallyl-4-methylphenoxyacetyl chloride as a pale red oil, yield 34%.

Example 23

20.05 grams (0.1 mole) of p-methoxyphenoxyacetyl chloride was heated to 105–110° C., a vacuum of 40 mm. applied and 20.2 grams (0.1 mole) of tris allyl phosphite was added dropwise. The temperature was increased to 150–155° C. for 30 minutes. The vacuum was increased to 5 mm. for an additional 30 minutes to give O,O-diallyl-p-methoxyphenoxyacetyl phosphonate as pale red oil in about 100% yield. It was restripped at 140° C. at 2 mm. to give the purified product a pale red oil (Yield 38.5%).

Example 24

The procedure of Example 23 was repeated, replacing the p-methoxyphenoxyacetyl chloride by 0.1 mole of p-chlorophenoxyacetyl chloride to obtain O,O-diallyl-4-

Example 26

The procedure of Example 25 was repeated replacing the 2-methyl-4-chlorophenoxyacetyl chloride by 0.1 mole of 2,4-dichlorophenoxyacetyl chloride to produce O,O-diallyl-2,4-dichlorophenoxyacetyl phosphonate as a solid, M.P. 85° C. in a yield of 51%.

Example 27

The procedure of Example 25 was repeated replacing the 2-methyl-4-chlorophenoxyacetyl chloride by 0.1 mole of 2,4,5-trichlorophenoxyacetyl chloride to produce O,O-diallyl-2,4,5-trichlorophenoxyacetyl phosphonate as a pale red oil (Yield 30%).

Example 28

17.1 grams (0.1 mole) of phenoxyacetyl chloride was heated to 105–110° C., a vacuum of 40–50 mm. was applied and 24.4 grams (0.1 mole) of tromethallyl phosphite was added dropwise. The vacuum was increased to 5 mm. for 30 minutes. The product was then stripped at 140° C. and 2 mm. to gove O,O-dimethallyl phenoxyacetyl phosphonate as a pale yellow oil (Yield 89%).

Example 29

The procedure of Example 28 was repeated replacing the phenoxyacetyl chloride by 0.1 mole of 4-methylphenoxyacetyl chloride to produce O,O-dimethyallyl-4-methylphenoxyacetyl phosphonate as a yellow oil (Yield 86%).

Example 30

The procedure of Example 28 was repeated replacing the phenoxyacetyl chloride by 0.1 mole of 4-methoxyphenoxyacetyl chloride to produce O,O-dimethallyl-4- methoxyphenoxyacetyl phosphonate as an oil (Yield 99%).

Example 31

The procedure of Example 28 was repeated replacing the phenoxyacetyl chloride by 0.1 mole of 4-chlorophenoxyacetyl chloride to produce O,O-dimethallyl-4-chlorophenoxyacetyl phosphonate as a yellow oil (Yield 94%).

Example 32

The procedure of Example 28 was repeated replacing the phenoxyacetyl chloride by 0.1 mole of 2-methyl-4-chlorophenoxyacetyl chloride to produce O,O-dimethallyl-2-methyl-4-chlorophenoxyacetyl phosphonate as a yellow oil (Yield 96%).

Example 33

The procedure of Example 28 was repeated replacing the phenoxyacetyl chloride by 0.1 mole of 2,4-dichlorophenoxyacetyl chloride to produce O,O-dimethallyl-2,4-dichlorophenoxyacetyl phosphonate as a white waxy solid, M.P. 80° C. (Yield 83%).

Example 34

The procedure of Example 28 was repeated replacing the phenoxyacetyl chloride by 0.1 mole of 2,4,5-trichlorophenoxyacetyl chloride to produce O,O-dimethallyl-2,4,5-trichlorophenoxyacetyl phosphonate as a white waxy solid (Yield 70%).

The compounds of the present invention can be used alone as herbicides, defoliants or desiccants but it has been found desirable to apply them together with inert solids to form dusts, or more preferably suspended in a suitable liquid diluent, preferably water. There can also be added surface active agents and inert solids in such liquid formulations. Desirably, 0.05–1% by weight of surface active agent is employed. The active ingredient can be from 0.01 to 95% by weight of the entire composition in such cases.

In place of water there can be employed organic solvents as carriers, e.g. hydrocarbons such as benzene, toluene, xylene, kerosene, diesel oil, fuel oil, and petroleum naphtha, ketones such as acetone, methyl ethyl ketone and cyclohexanone, chlorinated hydrocarbons such as carbon tetrachloride, chloroform, trichloroethylene and perchloroethylene, esters such as ethyl acetate, amyl acetate and butyl acetate, ethers, e.g. ethylene glycol monomethyl ether and diethylene glycol monomethyl ether, alcohols, e.g. ethanol, isopropanol and amyl alcohol, etc.

The herbicides, defoliants and desiccants of the present invention can also be applied with inert herbicidal adjuvants or carriers such as talc, pyrophyllite, synthetic fine silica, Attaclay, kieselguhr, chalk, diatomaceous earth, lime, calcium carbonate, bentonite, fuller's earth, cottonseed hulls, wheat flour, soyabean flour, pumice, tripoli, wood flour, walnut shell flour, redwood flour and lignin.

It is frequently desirable to incorporate a surface active agent in the herbicidal, defoliant or desiccant compositions of this invention. Such surface active agents, i.e., wetting agents, are advantageously employed in both the solid and liquid compositions. The surface active agent can be anionic, cationic or nonionic in character.

Typical classes of surface active agents include alkyl sulfonate salts, alkylaryl sulfonate salts, alkyl sulfate salts, alkylamide sulfonate salts, alkylaryl polyether alcohols, fatty acid esters of polyhydric alcohols and the alkylene oxide addition products of such esters, and addition products of long chain mercaptans and alkylene oxides. Typical examples of such surface active agents include the sodium alkyl benzen sulfonates having 14 to 18 carbon atoms in the alkyl group, alkylphenolethylene oxide condensation products, e.g. p-isooctylphenol condensed with 10 ethylene oxide units, soaps, e.g. sodium stearate and potassium oleate, sodium salt of propylnaphthalene sulfonic acid, (di-2-ethyl hexyl) ester of sodium sulfosuccinic acid, sodium lauryl sulfate, sodium salt of the sulfonated monoglyceride of cocoanut fatty acids, sorbitan sesquioleate, lauryl trimethyl ammonium chloride, octadecyl trimethyl ammonium chloride, polyethylene glycol lauryl ether, polyethylene esters of fatty acids and rosin acids, e.g. Ethofat 7 and 13, sodium N-methyl-N-oleyltaurate, Turkey red oil, sodium dibutylnaphthalene sulfonate, sodium lignin sulfonate (Marasperse N), polyethylene glycol stearate, sodium dodecylbenzene sulfonate, tertiary dodecyl polyethylene glycol thioether (Nonionic 218), long chain ethylene oxide propylene oxide condensation product, e.g. Pluronic 61, sorbitan monolaurate, polyethylene glycol ester of tall oil acids, sodium octylphenoxyethoxyethyl sulfate, tris (polyoxyethylene) sorbitan monostearate (Tween 60), sodium dihexyl sulfosuccinate.

The solid and liquid formulations can be prepared by any of the conventional methods. Thus the active ingredient can be mixed with the solid carrier in finely divided form in amounts small enough to preserve the free-flowing property of the final dust composition.

When using the compounds as defoliants or desiccants, they of course should be used in an amount less than that which will have a herbicidal effect on the plants to be defoliated or desiccated. While the compounds are primarily useful in the defoliant and desiccant field with cotton, they can also be employed to defoliate or desiccate other crops such as beans for example.

In the following examples or tables illustrating herbicidal activity the phosphonates were formulated into the following pre-mix, the parts being expressed by volume.

8 parts of a mixture of mono-, di- and tri-methyl naphthalenes (Velsicol AR 50 G)

1 part butyl carbitol acetate 1 part Triton X 161 (a mixture of p-octyl-phenolethylene oxide adduct containing about 16 ethylene oxide units together with a sodium alkylphenol sulfonate)

Two pounds per gallon of the test chemical were added to this pre-mix.

In the pre-emergent herbicide tests the efficiency of the candidate was measured by planting the indicated plants in soil and spraying the surface of the soil with the chemical the same day the plants are planted.

In the post-emergent herbicide tests, the plants were allowed to grow for 10–14 days prior to application of the herbicides.

In the following tables the effect of the herbicide is mentioned on the scale from 0–10 where 0 is no effect and 10 is complete herbicide effect, namely 100% dead plants.

In the tables the rates are expressed in pounds of active ingredient per acre.

Table 1 is a preliminary post-emergent herbicide test and Table 2 is a preliminary pre-emergent herbicide test.

In all of the herbicide tables the compounds employed have the following formula:

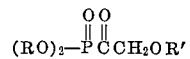

where R and R' have the indicated values.

Because these preliminary tests showed good herbicidal results the testing was repeated and expanded to include other compounds within the formula as set forth in following Tables 3–8. As can be seen from Tables 3–8 the compounds of the present invention show selective activity as pre-emergent and post-emergent herbicides. Thus O,O - diallyl-4-methylphenoxyacetyl phosphonate, O,O - diallyl - 4 - methoxyphenoxyacetyl phosphonate, O,O - dimethyallyl - 4 - methylphenoxyacetyl phosphonate and O,O - dimethallyl - 4 - methoxyphenoxyacetyl phosphonate showed excellent selectivity as pre-emergent herbicides for broad leaf plants.

Furthermore, several of the compounds including O,O-dimethyl-(2,4,5-trichlorophenoxy acetyl) phosphonate, O,O - di - n - butyl-(2,4,5-trichlorophenoxy acetyl) phosphonate, O,O - diphenyl - (2,5-trichlorophenoxy acetyl) phosphonate, O,O - diethyl - (4-chlorophenoxy acetyl) phosphonate, O,O-di - n - butyl-(4-chlorophenoxy acetyl) phosphonate, O,O - diphenyl-(4-chlorophenoxy acetyl) phosphonate, and O,O - di - (2-ethyl hexyl)-(4-chlorophenoxy acetyl) phosphonate as well as the allyl and methallyl esters of 4-chlorophenoxyacetyl phosphonic acid, 2-methyl - 4 - chlorophenoxyacetyl phosphonic acid, 2,4-dichlorophenoxyacetyl phosphonic acid and 2,4,5-trichlorophenoxyacetyl phosphonic acid exhibit high herbicidal activity on broad leaf plants accompanied by effective action against grasses.

TABLE 1

| R | R' | Rate | Flax | Sugar beets | Radish | Bean | Wheat | Oats |
|---|---|---|---|---|---|---|---|---|
| Ethyl | 2,4,5-trichlorophenyl | 20 | 10 | 10 | 10 |  | 7 | 8 |
|  |  | 5 | 10 | 10 | 9 |  | 8 | 3 |
| Do | 2-methyl-4-chlorophenyl | 8 | 10 |  | 10 | 9 | 9 | 9 |
|  |  | 2 | 8 |  | 9 | 9 | 7 | 4 |
| Do | 2-chlorophenyl | 8 | 6 |  | 9 | 9 | 8 | 9 |
|  |  | 2 | 2 |  | 3 | 1 | 4 | 2 |

TABLE 2

| R | R' | Rate | Flax | Sugar beets | Radish | Bean | Wheat | Oats |
|---|---|---|---|---|---|---|---|---|
| Ethyl | 2,4,5-trichlorophenyl | 20 | 8 | 10 | 8 |  | 0 | 0 |
|  |  | 5 | 5 | 7 | 4 |  | 0 | 0 |
| Do | 2-methyl-4-chlorophenyl | 8 | 4 |  | 9 | 9 | 3 | 0 |
|  |  | 2 | 5 |  | 9 | 9 | 0 | 0 |
| Do | 2-chlorophenyl | 8 | 2 |  | 3 | 3 | 0 | 4 |
|  |  | 2 | 0 |  | 0 | 0 | 0 | 0 |

TABLE 3
[Primary screening, post-emergence activity]

| R' | R | Rate | Oats | Sugar beets | Radishes | Flax | Wheat |
|---|---|---|---|---|---|---|---|
| 4-chlorophenyl | Methyl | 8 | 7 | 9 | 9 | 9 | 6 |
|  |  | 8 | 4 | 6 | 8 | 9 | 0 |
| Do | Ethyl | 8 | 3 | 8 | 8 | 8 | 9 |
|  |  | 2 | 1 | 2 | 7 | 7 | 0 |
| Do | n-Butyl | 2 | 0 | 3 | 7 | 6 | 6 |
|  |  | 2 | 0 | 3 | 7 | 6 | 0 |
| Do | Phenyl | 8 | 2 | 6 | 8 | 9 | 6 |
|  |  | 2 | 0 | 3 | 6 | 4 | 0 |
| 2-chlorophenyl | Methyl | 8 | 5 | 6 | 6 | 8 | 4 |
|  |  | 2 | 0 | 1 | 5 | 0 | 0 |
| Do | Ethyl | 8 | 3 | 3 | 5 | 3 | 3 |
|  |  | 2 | 1 | 0 | 2 | 0 | 0 |
| Do | n-Butyl | 8 | 6 | 9 | 7 | 7 | 7 |
|  |  | 2 | 0 | 0 | 3 | 0 | 3 |
| Do | Phenyl | 8 | 8 | 9 | 7 | 6 | 7 |
|  |  | 2 | 0 | 0 | 3 | 0 | 1 |
| 2,4,5-trichlorophenyl | Methyl | 8 | 6 | 8 | 9 | 10 | 8 |
|  |  | 2 | 1 | 5 | 8 | 8 | 3 |
| Do | Ethyl | 8 | 7 | 9 | 9 | 9 | 6 |
|  |  | 2 | 1 | 2 | 7 | 7 | 0 |
| Do | n-Butyl | 8 | 7 | 7 | 8 | 10 | 6 |
|  |  | 2 | 7 | 5 | 7 | 7 | 3 |
| Do | Phenyl | 8 | 7 | 10 | 9 | 9 | 7 |
|  |  | 2 | 6 | 6 | 8 | 9 | 6 |
| 4-chloro-2-methyl phenyl | Methyl | 8 | 7 | 10 | 9 | 7 | 6 |
|  |  | 2 | 1 | 6 | 8 | 6 | 1 |
| Do | Ethyl | 8 | 6 | 7 | 9 | 8 | 5 |
|  |  | 2 | 0 | 2 | 7 | 3 | 0 |
| Do | n-Butyl | 8 | 6 | 9 | 9 | 8 | 8 |
|  |  | 2 | 3 | 5 | 8 | 0 | 0 |
| Do | Phenyl | 8 | 3 | 6 | 7 | 4 | 6 |
|  |  | 2 | 0 | 4 | 7 | 4 | 0 |
| 2-chlorophenyl | 2-ethyl hexyl | 8 | 7 | 6 | 6 | 3 | 2 |
|  |  | 2 | 0 | 0 | 1 | 0 | 1 |
| 4-chlorophenyl | do | 8 | 6 | 6 | 8 | 7 | 8 |
|  |  | 2 | 4 | 6 | 7 | 6 | 1 |
| 4-chloro-2-methyl phenyl | do | 8 | 7 | 9 | 9 | 8 | 9 |
|  |  | 2 | 0 | 5 | 8 | 4 | 0 |
| 2,4,5-trichlorophenyl | do | 8 | 9 | 9 | 9 | 9 | 7 |
|  |  | 2 | 6 | 8 | 9 | 7 | 3 |

TABLE 4

[Primary screening, pre-emergence activity]

| R' | R | Rate | Oats | Sugar beets | Radishes | Flax | Wheat |
|---|---|---|---|---|---|---|---|
| 4-chlorophenyl | Methhl | 8 | 4 | 10 | 10 | 10 | 9 |
|  |  | 2 | 1 | 8 | 8 | 10 | 7 |
| Do | Ethyl | 8 | 3 | 10 | 9 | 10 | 8 |
|  |  | 2 | 0 | 8 | 8 | 10 | 7 |
| Do | n-Butyl | 8 | 4 | 10 | 10 | 10 | 9 |
|  |  | 2 | 3 | 8 | 9 | 10 | 5 |
| Do | Phenyl | 8 | 6 | 9 | 9 | 10 | 7 |
|  |  | 2 | 6 | 9 | 9 | 10 | 7 |
| 2-chlorophenyl | Methyl | 8 | 0 | 7 | 7 | 6 | 6 |
|  |  | 2 | 0 | 4 | 5 | 3 | 4 |
| Do | Ethyl | 8 | 0 | 0 | 0 | 0 | 0 |
|  |  | 2 | 0 | 0 | 0 | 0 | 0 |
| Do | n-Butyl | 8 | 2 | 5 | 6 | 4 | 6 |
|  |  | 2 | 0 | 2 | 4 | 2 | 6 |
| Do | Phenyl | 8 | 5 | 7 | 7 | 6 | 3 |
|  |  | 2 | 0 | 0 | 5 | 5 | 0 |
| 2,4,5-trichlorophenyl | Methyl | 8 | 4 | 10 | 10 | 10 | 8 |
|  |  | 2 | 0 | 6 | 7 | 8 | 3 |
| Do | Ethyl | 8 | 2 | 7 | 7 | 9 | 1 |
|  |  | 2 | 2 | 2 | 0 | 1 | 2 |
| Do | n-Butyl | 8 | 3 | 8 | 8 | 9 | 6 |
|  |  | 2 | 2 | 6 | 7 | 6 | 2 |
| Do | Phenyl | 8 | 4 | 9 | 8 | 9 | 6 |
|  |  | 2 | 3 | 7 | 8 | 9 | 3 |
| 4-chloro-2-methylphenyl | Methyl | 8 | 7 | 10 | 10 | 10 | 9 |
|  |  | 2 | 3 | 10 | 10 | 10 | 8 |
| Do | Ethyl | 8 | 6 | 9 | 9 | 9 | 9 |
|  |  | 2 | 3 | 8 | 8 | 5 | 4 |
| Do | n-Butyl | 8 | 9 | 10 | 10 | 10 | 9 |
|  |  | 2 | 0 | 9 | 9 | 9 | 6 |
| Do | Phenyl | 8 | 3 | 10 | 10 | 10 | 7 |
|  |  | 2 | 0 | 9 | 9 | 8 | 3 |
| 2-chlorophenyl | 2-ethyl-hexyl | 8 | 4 | 4 | 7 | 5 | 2 |
|  |  | 2 | 0 | 3 | 5 | 2 | 0 |
| 4-chlorophenyl | do | 8 | 7 | 9 | 9 | 10 | 9 |
|  |  | 2 | 6 | 9 | 9 | 10 | 6 |
| 4-chloro-2-methyl phenyl | do | 8 | 9 | 10 | 10 | 10 | 9 |
|  |  | 2 | 4 | 8 | 9 | 4 | 4 |
| 2,4,5-trichlorophenyl | do | 8 | 7 | 9 | 9 | 10 | 8 |
|  |  | 2 | 0 | 8 | 7 | 9 | 3 |

TABLE 5

[Secondary screening, post-emergence activity]

| R' | R | Rate | Oats | Cuc. | Snap beans | Corn | Wheat | Flax | Cotton | Radish | Sugar beets | Alfalfa |
|---|---|---|---|---|---|---|---|---|---|---|---|---|
| 4-chlorophenyl | Methyl | 4 | 5 | 10 | 10 |  | 1 | 9 | 8 | 8 | 9 | 10 |
|  |  | 2 | 1 | 7 | 9 | 0 | 0 | 7 | 7 | 9 | 8 | 7 |
|  |  | 1 | 0 | 6 | 8 | 0 | 0 | 6 | 7 | 9 | 9 | 7 |
| Do | Ethyl | 4 | 3 | 9 | 10 | 6 | 5 | 9 | 8 | 9 | 10 | 10 |
|  |  | 2 | 0 | 9 | 10 | 6 | 6 | 9 | 8 | 8 | 7 | 8 |
|  |  | 1 | 1 | 7 | 9 | 1 | 0 | 6 | 6 | 8 | 8 | 7 |
| Do | n-Butyl | 4 | 7 | 9 | 10 | 3 | 6 | 9 | 7 | 9 | 9 | 7 |
|  |  | 2 | 0 | 9 | 10 | 0 | 4 | 6 | 7 | 8 | 6 | 7 |
|  |  | 1 | 0 | 7 | 9 | 0 | 5 | 5 | 7 | 8 | 5 | 7 |
| Do | Phenyl | 4 | 3 | 10 | 9 | 0 | 4 | 10 | 9 | 9 | 9 | 8 |
|  |  | 2 | 0 | 6 | 8 | 1 | 0 | 5 | 5 | 8 | 6 | 7 |
|  |  | 1 | 0 | 7 | 9 | 0 | 0 | 3 | 5 | 9 | 7 | 6 |
| 2,4,5-trichlorophenyl | Methyl | 4 | 7 | 10 | 10 | 2 | 0 | 10 | 7 | 10 | 10 | 10 |
|  |  | 2 | 3 | 10 | 10 | 3 | 0 | 9 | 7 | 10 | 10 | 10 |
|  |  | 1 | 0 | 10 | 10 | 0 | 0 | 9 | 8 | 9 | 8 | 7 |
| Do | Ethyl | 4 | 10 | 10 | 10 | 4 | 2 | 10 | 8 | 9 | 10 | 10 |
|  |  | 2 | 1 | 10 | 10 | 4 | 2 | 8 | 9 | 9 | 10 | 9 |
|  |  | 1 | 0 | 10 | 8 | 0 | 0 | 7 | 7 | 9 | 10 | 9 |
| Do | n-Butyl | 4 | 6 | 10 | 10 | 1 | 6 | 10 | 9 | 10 | 10 | 10 |
|  |  | 2 | 1 | 10 | 10 | 0 | 2 | 8 | 8 | 9 | 9 | 9 |
|  |  | 1 | 3 | 10 | 7 | 0 | 3 | 9 | 8 | 9 | 7 | 7 |
| Do | Phenyl | 4 | 9 | 10 | 10 | 2 | 6 | 10 | 7 | 10 | 10 | 8 |
|  |  | 2 | 3 | 10 | 10 | 3 | 2 | 10 | 8 | 9 | 9 | 8 |
|  |  | 1 | 0 | 10 | 10 | 2 | 1 | 10 | 8 | 9 | 7 | 7 |
| 4-chloro-2-methylphenyl | Methyl | 4 | 0 | 10 | 9 | 2 | 6 | 9 | 9 | 10 | 10 | 10 |
|  |  | 2 | 0 | 8 | 9 | 1 | 0 | 4 | 9 | 9 | 7 | 7 |
|  |  | 1 | 0 | 5 | 7 | 0 | 0 | 3 | 8 | 9 | 7 | 7 |
| Do | Ethyl | 4 | 3 | 10 | 9 | 7 | 8 | 9 | 9 | 10 | 10 | 10 |
|  |  | 2 | 0 | 7 | 7 | 0 | 1 | 3 | 8 | 9 | 7 | 7 |
|  |  | 1 | 0 | 8 | 7 | 0 | 1 | 5 | 8 | 9 | 8 | 8 |
| Do | n-Butyl | 4 | 0 | 8 | 9 | 4 | 8 | 4 | 8 | 10 | 10 | 10 |
|  |  | 2 | 0 | 6 | 7 | 2 | 0 | 4 | 9 | 10 | 10 | 10 |
|  |  | 1 | 0 | 6 | 8 | 0 | 0 | 3 | 9 | 9 | 5 | 7 |
| Do | Phenyl | 4 | 2 | 10 | 10 | 3 | 4 | 6 | 8 | 9 | 10 | 10 |
|  |  | 2 | 0 | 8 | 9 | 2 | 0 | 5 | 8 | 9 | 5 | 6 |
|  |  | 1 | 0 | 4 | 9 | 0 | 0 | 5 | 8 | 9 | 4 | 6 |
| 4-chlorophenyl | 2-ethyl hexyl | 4 | 0 | 8 | 8 | 10 | 0 | 9 | 10 | 10 | 10 | 7 |
|  |  | 2 | 0 | 7 | 9 | 2 | 0 | 6 | 7 | 8 | 7 | 7 |
|  |  | 1 | 0 | 6 | 9 | 0 | 0 | 6 | 6 | 6 | 4 | 5 |
| 4-chloro-2-methylphenyl | do | 4 | 2 | 10 | 10 | 1 | 0 | 7 | 9 | 10 | 10 | 10 |
|  |  | 2 | 2 | 10 | 9 | 0 | 0 | 6 | 9 | 10 | 8 | 8 |
|  |  | 1 | 0 | 7 | 8 | 0 | 0 | 5 | 9 | 9 | 9 | 9 |
| 2,4,5-trichlorophenyl | do | 4 | 6 | 10 | 10 | 6 | 2 | 10 | 8 | 10 | 10 | 9 |
|  |  | 2 | 0 | 10 | 10 | 6 | 3 | 10 | 9 | 10 | 9 | 8 |
|  |  | 1 | 1 | 10 | 10 | 6 | 3 | 10 | 9 | 9 | 9 | 8 |

TABLE 6.—SECONDARY SCREENING—PRE-EMERGENCE ACTIVITY

| R' | R | Rate | Oats | Cuc. | Snap beans | Corn | Wheat | Flax | Cotton | Radish | Sugar beets | Alfalfa |
|---|---|---|---|---|---|---|---|---|---|---|---|---|
| 4-chlorophenyl | Methyl | 4 | 3 | 8 | 9 | 0 | 2 | 9 | 8 | 9 | 8 | 8 |
|  |  | 2 | 3 | 5 | 7 | 0 | 0 | 7 | 3 | 8 | 9 | 6 |
|  |  | 1 | 2 | 5 | 8 | 0 | 0 | 7 | 5 | 0 | 8 | 6 |
| Do | Ethyl | 4 | 4 | 8 | 7 | 0 | 4 | 8 | 8 | 8 | 5 | 5 |
|  |  | 2 | 0 | 7 | 7 | 0 | 2 | 8 | 5 | 7 | 7 | 4 |
|  |  | 1 | 0 | 4 | 7 | 0 | 2 | 7 | 3 | 8 | 6 | 6 |
| Do | n-Butyl | 4 | 0 | 7 | 8 | 0 | 3 | 8 | 5 | 8 | 9 | 7 |
|  |  | 2 | 0 | 3 | 7 | 0 | 2 | 7 | 3 | 7 | 7 | 4 |
|  |  | 1 | 0 | 5 | 6 | 0 | 0 | 6 | 1 | 6 | 6 | 4 |
| Do | Phenyl | 4 | 0 | 6 | 8 | 0 | 6 | 7 | 4 | 8 | 4 | 6 |
|  |  | 2 | 0 | 4 | 7 | 0 | 0 | 6 | 0 | 6 | 5 | 3 |
|  |  | 1 | 0 | 3 | 6 | 0 | 0 | 6 | 1 | 7 | 7 | 2 |
| 2,4,5-trichlorophenyl | Methyl | 4 | 5 | 7 | 9 | 2 | 4 | 8 | 0 | 8 | 7 | 8 |
|  |  | 2 | 0 | 3 | 6 | 1 | 0 | 7 | 0 | 7 | 8 | 9 |
|  |  | 1 | 0 | 3 | 7 | 0 | 0 | 6 | 0 | 1 | 6 | 7 |
| Do | Ethyl | 4 | 0 | 3 | 0 | 0 | 0 | 4 | 0 | 6 | 7 | 7 |
|  |  | 2 | 0 | 2 | 0 | 0 | 0 | 2 | 0 | 5 | 0 | 4 |
|  |  | 1 | 0 | 0 | 0 | 0 | 0 | 0 | 0 | 0 | 0 | 0 |
| Do | n-Butyl | 4 | 3 | 4 | 8 | 0 | 0 | 8 | 0 | 7 | 8 | 9 |
|  |  | 2 | 0 | 2 | 5 | 0 | 0 | 5 | 0 | 5 | 6 | 7 |
|  |  | 1 | 0 | 2 | 0 | 0 | 0 | 4 | 0 | 2 | 6 | 0 |
| Do | Phenyl | 4 | 3 | 7 | 9 | 3 | 3 | 7 | 0 | 5 | 4 | 10 |
|  |  | 2 | 0 | 1 | 4 | 0 | 0 | 7 | 0 | 7 | 4 | 6 |
|  |  | 1 | 0 | 0 | 0 | 0 | 0 | 6 | 0 | 5 | 5 | 7 |
| 4-chloro-2-methyl phenyl | Methyl | 4 | 6 | 8 | 7 | 4 | 7 | 8 | 9 | 10 | 10 | 10 |
|  |  | 2 | 5 | 8 | 5 | 2 | 6 | 9 | 9 | 10 | 10 | 10 |
|  |  | 1 | 3 | 7 | 3 | 0 | 3 | 8 | 9 | 9 | 9 | 10 |
| Do | Ethyl | 4 | 2 | 9 | 6 | 4 | 7 | 7 | 9 | 10 | 9 | 9 |
|  |  | 2 | 1 | 7 | 7 | 2 | 5 | 7 | 9 | 9 | 8 | 9 |
|  |  | 1 | 0 | 7 | 7 | 1 | 5 | 5 | 8 | 10 | 10 | 10 |
| Do | n-Butyl | 4 | 5 | 7 | 3 | 2 | 4 | 8 | 9 | 10 | 10 | 9 |
|  |  | 2 | 3 | 6 | 4 | 0 | 3 | 7 | 8 | 8 | 9 | 9 |
|  |  | 1 | 3 | 7 | 5 | 1 | 4 | 6 | 9 | 10 | 7 | 10 |
| Do | Phenyl | 4 | 3 | 8 | 4 | 2 | 4 | 5 | 9 | 10 | 9 | 9 |
|  |  | 2 | 3 | 3 | 3 | 0 | 4 | 4 | 7 | 9 | 9 | 5 |
|  |  | 1 | 0 | 3 | 1 | 0 | 0 | 4 | 9 | 9 | 6 | 0 |
| 4-chlorophenyl | 2-ethyl hexyl | 4 | 1 | 3 | 7 | 0 | 4 | 7 | 4 | 7 | 6 | 0 |
|  |  | 2 | 1 | 4 | 6 | 0 | 1 | 6 | 3 | 6 | 4 | 0 |
|  |  | 1 | 0 | 0 | 6 | 0 | 1 | 5 | 2 | 3 | 3 | 10 |
| 4-chloro-2-methyl phenyl | do | 4 | 3 | 7 | 6 | 2 | 5 | 8 | 9 | 9 | 9 | 9 |
|  |  | 2 | 2 | 5 | 6 | 0 | 5 | 6 | 7 | 9 | 6 | 9 |
|  |  | 1 | 1 | 6 | 2 | 1 | 4 | 7 | 3 | 6 | 9 | 10 |
| 2,4,5-trichlorophenyl | do | 4 | 6 | 6 | 3 | 0 | 0 | 0 | 8 | 6 | 3 | 8 |
|  |  | 2 | 0 | 0 | 5 | 0 | 0 | 9 | 0 | 5 | 3 | 5 |
|  |  | 1 | 0 | 2 | 0 | 0 | 0 | 5 | 1 | 2 | 2 | 5 |

TABLE 7.—PRIMARY SCREENING PRE-EMERGENT ACTIVITY

| R' | R | Rate | Oats | Sugar beets | Radish | Flax | Wheat |
|---|---|---|---|---|---|---|---|
| Phenyl | Allyl | 20 | 3 | 9 | 9 | 5 | 0 |
|  |  | 10 | 0 | 0 | 2 | 0 | 0 |
| p-Tolyl | do | 20 |  |  |  |  |  |
|  |  | 10 | 0 | 6 | 7 | 0 | 0 |
| p-Methoxyphenyl | do | 20 |  |  |  |  |  |
|  |  | 10 | 0 | 2 | 7 | 5 | 0 |
| p-Chlorophenyl | do | 20 | 8 | 10 | 10 | 10 | 8 |
|  |  | 10 | 6 | 10 | 10 | 10 | 9 |
| 2-methyl-4-chlorophenyl | do | 20 | 6 | 10 | 10 | 10 | 9 |
|  |  | 10 | 8 | 10 | 10 | 10 | 9 |
| 2,4-dichlorophenyl | do | 20 | 7 | 10 | 10 | 10 | 8 |
|  |  | 10 | 7 | 10 | 10 | 9 | 8 |
| 2,4,5-trichlorophenyl | do | 20 |  |  |  |  |  |
|  |  | 10 | 7 | 10 | 10 | 10 | 7 |
| Phenyl | Methallyl | 20 | 5 | 9 | 10 | 8 | 6 |
|  |  | 10 | 4 | 7 | 9 | 7 | 4 |
| p-Tolyl | do | 20 | 0 | 7 | 7 | 1 | 0 |
|  |  | 10 | 0 | 3 | 6 | 0 | 0 |
| p-Methoxyphenyl | do | 20 | 0 | 5 | 8 | 3 | 0 |
|  |  | 10 | 0 | 0 | 1 | 0 | 0 |
| p-Chlorophenyl | do | 20 | 7 | 9 | 10 | 10 | 5 |
|  |  | 10 | 4 | 9 | 9 | 9 | 7 |
| 2-methyl-4-chlorophenyl | do | 20 | 7 | 10 | 10 | 9 | 7 |
|  |  | 10 | 7 | 10 | 10 | 9 | 8 |
| 2,4-dichlorophenyl | do | 20 | 4 | 9 | 10 | 8 | 4 |
|  |  | 10 | 6 | 9 | 10 | 8 | 6 |
| 2,4,5-trichlorophenyl | do | 20 | 4 | 10 | 10 | 9 | 10 |
|  |  | 10 | 3 | 10 | 10 | 9 | 10 |

TABLE 8.—PRIMARY SCREENING POST-EMERGENT ACTIVITY

| R' | R' | Rate | Oats | Sugar beets | Radish | Flax | Wheat |
|---|---|---|---|---|---|---|---|
| Phenyl | Allyl | 8 / 2 | 3 / 1 | 6 / 3 | 4 / 0 | 1 / 1 | 1 / 0 |
| p-Tolyl | do | 8 / 2 | 4 / 1 | 6 / 1 | 6 / 1 | 5 / 0 | 0 / 0 |
| p-Methoxyphenyl | do | 8 / 2 | 1 / 1 | 3 / 3 | 1 / 3 | 1 / 0 | 0 / 0 |
| p-Chlorophenyl | do | 8 / 2 | 6 / 3 | 9 / 6 | 8 / 7 | 9 / 7 | 1 / 1 |
| 2-methyl-4-chlorophenyl | do | 8 / 2 | 6 / 4 | 10 / 9 | 9 / 8 | 7 / 8 | 6 / 1 |
| 2,4-dichlorophenyl | do | 8 / 2 | 6 / 6 | 10 / 10 | 9 / 9 | 9 / 8 | 6 / 3 |
| 2,4,5-trichlorophenyl | do | 8 / 2 | 2 / 2 | 10 / 10 | 7 / 9 | 8 / 8 | 4 / 5 |
| Phenyl | Methallyl | 8 / 2 | 5 / 1 | 9 / 6 | 8 / 6 | 7 / 6 | 1 / 0 |
| p-Tolyl | do | 8 / 2 | 3 / 1 | 7 / 6 | 6 / 3 | 5 / 1 | 0 / 1 |
| p-Methoxyphenyl | do | 8 / 2 | 3 / 2 | 7 / 5 | 6 / 3 | 1 / 1 | 1 / 0 |
| p-Chlorophenyl | do | 8 / 2 | 4 / 1 | 9 / 4 | 8 / 4 | 7 / 5 | 2 / 2 |
| 2-methyl-4-chlorophenyl | do | 8 / 2 | 5 / 3 | 10 / 8 | 8 / 8 | 7 / 7 | 3 / 1 |
| 2,4-dichlorophenyl | do | 8 / 2 | 4 / 2 | 9 / 8 | 8 / 8 | 8 / 7 | 1 / 1 |
| 2,4,5-trichlorophenyl | do | 8 / 2 | 6 / 8 | 10 / 8 | 9 / 8 | 9 / 8 | 2 / 1 |

In the following table illustrating defoliant and desiccant activity, the phosphonates were formulated into a mixture containing 0.5 gram of the test chemical in 25 ml. of acetone containing 1/2% of Tween 20 [tris(polyoxyethylene)sorbitanmonolaurate]. This mixture was sprayed on cotton plants in the flowering stage of development using the indicated dosages in pounds of active ingredient per acre. Observations were made 7 days after spraying the plants. In some instances only the desiccation effect was recorded and in other cases the results of both defoliation and desiccation were noted. The results are set forth in Table 9. The compounds employed in Table 9 had the formula

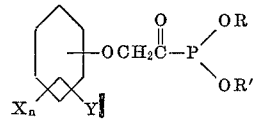

where $n$ is an integer from 1 to 3, X is chlorine, Y is hydrogen or methyl and the unspecified carbon atoms of the benzene ring are attached to hydrogen.

TABLE 9

| X | Y | R' and R | Rate, lbs./acre | Percent defoliation | Percent desiccation |
|---|---|---|---|---|---|
| 4-chloro | Hydrogen | Methyl | 8 / 2 | 21.7 / 5.9 | 65 / 45 |
| Do | do | Ethyl | 8 / 2 | 10.5 / 0.0 | 65 / 50 |
| Do | do | n-Butyl | 8 / 2 | 0 / 0 | 55 / 60 |
| Do | do | 2'-ethylhexyl | 8 | 0 | 45 |
| Do | do | Phenol | 8 / 2 | 67 / 0 | 60 / 40 |
| 2-chloro | do | Ethyl | 8 / 2 | 0 / 0 | 35 / 25 |
| Do | do | n-Butyl | 8 / 2 | 71 / 71 | 50 / — |
| Do | do | 2'-ethylhexyl | 8 | 28.6 | 50 |
| Do | do | Phenyl | 8 / 2 | 0 / 67 | 20 / — |
| 4-chloro | 2-methyl | Methyl | 8 / 2 | 0 / 0 | 70 / 50 |
| Do | do | Ethyl | 8 / 2 | 11.8 / 6.3 | 70 / 70 |
| Do | do | n-Butyl | 8 / 2 | 0 / 0 | 65 / 65 |
| Do | do | 2'-ethylhoxyl | 8 | 0 | 50 |
| Do | do | Phenyl | 8 / 2 | 0 / 0 | 70 / 55 |
| 2,4,5-trichloro | Hydrogen | Methyl | 8 / 2 | 0 / 0 | 75 / 80 |
| Do | do | Ethyl | 8 / 2 | 0 / 0 | 80 / 55 |
| Do | do | n-Butyl | 8 / 2 | 0 / 0 | 70 / 75 |
| Do | do | 2'-ethylhexyl | 8 / 2 | 0 / 12.5 | 70 / — |
| Do | do | Phenyl | 8 / 2 | 0 / 0 | 75 / 75 |
| 4-chloro | do | 2'-chloroethyl | 8 / 2 | — | — |
| Do | do | Isopropyl | 8 / 2 | — | — |
| Do | 2-methyl | 2'-chloroethyl | 8 / 2 | — | — |
| Do | do | Isopropyl | 8 / 2 | — | 65 / 35 |
| Do | do | Octadecyl | 8 | — | 10 |
| 2,4-dichloro | Hydrogen | Methyl | 8 / 2 | — | 95 / 75 |
| Do | do | Ethyl | 8 / 2 | — | 95 / 60 |
| Do | do | Isopropyl | 8 / 2 | — | 95 / 95 |
| Do | do | 2'-chloroethyl | 8 / 2 | — | 50 / 50 |
| Do | do | n-Butyl | 8 / 2 | — | 100 / 65 |

TABLE 9.—Continued

| X | Y | R' and R | Rate, lbs./acre | Percent defoliation | Percent desiccation |
|---|---|---|---|---|---|
| 2,4-dichloro | Hydrogen | 2-ethylhexyl | 8 | | 80 |
|  |  |  | 2 | | 65 |
| Do | do | Octadecyl | 8 | | 30 |
| Do | do | Phenyl | 8 | | 80 |
|  |  |  | 2 | | 60 |
| 2,4,5-trichloro | do | 2'-chloroethyl | 8 | | 45 |
|  |  |  | 2 | | 35 |
| Do | do | Isopropyl | 8 | | 80 |
|  |  |  | 2 | | 60 |
| Do | do | Octadecyl | 8 | | 30 |

The herbicides of the present invention, and particularly the allyl esters show high activity as pre- and post-emergent herbicides, high selectivity in both grasses and broad leaf plants, high solubility in solvents which renders it easy to prepare formulations and low mammalian toxicity.

What is claimed is:

1. A compound having the formula

wherein R is lower alkenyl, and $R^1$ is selected from the group consisting of mono, di and trihalophenyl, monohalo monomethyl phenyl, phenyl, lower alkyl phenyl and lower alkoxyphenyl.

2. A compound according to claim 1 wherein R' has at least one halogen thereon and all halogens on the R' are chlorine.

3. A compound according to claim 1 wherein R is alkenyl of 3 to 4 carbon atoms.

4. A compound according to claim 3 wherein R is allyl.

5. A compound according to claim 4 wherein R' is tolyl.

6. A compound according to claim 4 wherein R' is mono or tri chlorophenyl or mono methyl mono chlorophenyl.

7. A compound according to claim 3 wherein R' is lower alkoxyphenyl.

References Cited

UNITED STATES PATENTS 3,378,610  4/1968  Gier _____ 260—940
3,456,039  7/7969  Berlger et al. _____ 260—941X JOSEPH P. BRUST, Primary Examiner
A. H. SUTTO, Assistant Examiner U.S. Cl. X.R.
71—71, 86; 260—940, 968, 969